Figure 1:
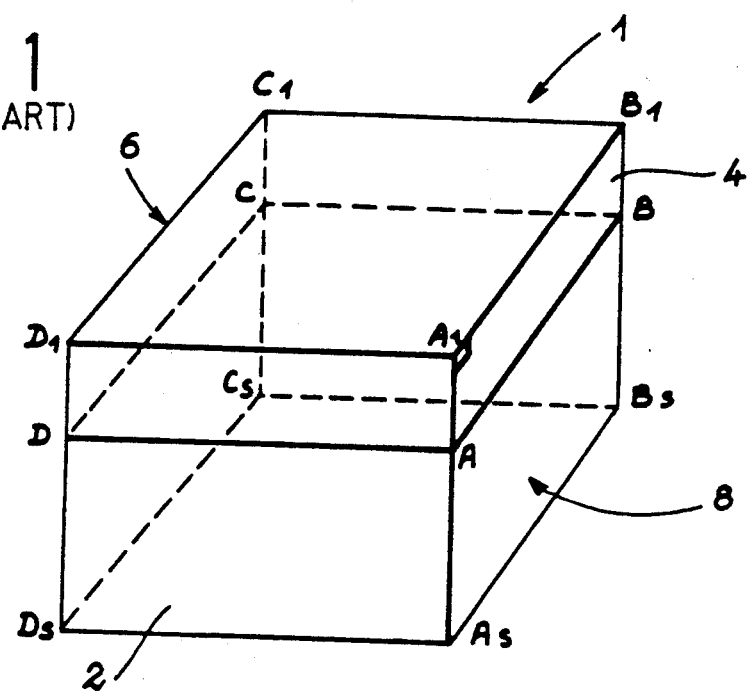

United States Patent [19]

Chambaz et al.

[11] Patent Number: 5,309,471

[45] Date of Patent: May 3, 1994

[54] OPTICALLY PUMPED LASER MINICAVITY, ITS PRODUCTION PROCESS AND LASER USING SAID CAVITY

[75] Inventors: Bernard Chambaz, Seyssins; Isabelle Chartier, Grenoble; Bernard Ferrand, Voreppe; Denis Pelenc, Fontaine, all of France

[73] Assignee: Commissariat a l'Energie Atomique, Paris, France

[21] Appl. No.: 988,461

[22] Filed: Dec. 10, 1992

[30] Foreign Application Priority Data

Dec. 16, 1991 [FR] France .............................. 91 15590

[51] Int. Cl.$^5$ .............................................. H01S 3/08
[52] U.S. Cl. ......................................... 372/92; 372/7; 372/49; 372/66; 372/70; 372/99
[58] Field of Search .................. 372/7, 43, 49, 66, 70, 372/92, 99

[56] References Cited

U.S. PATENT DOCUMENTS

| | | | |
|---|---|---|---|
| 3,579,142 | 5/1971 | Smiley | 372/7 |
| 4,002,998 | 1/1977 | Conwell et al. | 372/7 |
| 4,523,316 | 6/1985 | Botez | 372/45 |
| 5,023,877 | 6/1991 | Eden et al. | 372/7 |
| 5,107,538 | 4/1992 | Benton et al. | 385/130 |

OTHER PUBLICATIONS

Patent Abstracts of Japan, vol. 7, No. 140 (E-182)(1285), Jun. 18, 1983, & JP-A-58 054 690, Mar. 31, 1983, Taketoshi Hibiya, "Epitaxial Garnet Laser Element".

Siemens Research and Development Reports, vol. 5, No. 5 May 1976, pp. 287-295, G. Winzer, et al., "Miniature Neodymium Laser (MNL) As Possible Transmitters for Fiber-Optic Communication Systems", Part 1. Stoichiometric Materials.

Siemens Research and Development Reports, vol. 5, No. 5, May 1976, pp. 296-302, P. Mockel, et al., "Miniature Neodymium Laser (MNL) As Possible Transmitters for Fiber-Optic Communication Systems", Part 2. YAG:Nd$^3$-Waveguide Lasers.

Journal of Applied Physics, vol. 50, No. 2, Feb. 1979, pp. 653-659, Ken'Ichi Kubodera, et al., "Single-Transverse-Mode LiNdP$_4$O$_{12}$ Slab Waveguide Laser".

IEEE Photonics Technology Letters, vol. 2, No. 7, Jul. 1990, pp. 459-460, Hiroshi Aoki, et al., "Glass Waveguide Laser".

Journal of Applied Physics, vol. 45, No. 8, Aug. 1974, pp. 3460-3462, P. Mockel, et al., "A Flashlamp-Pumped YAG: Nd$^3$-Waveguide Laser".

Journal of Applied Physics, vol. 49, No. 1, Jan. 1978, pp. 65-68, Ken'Ichi Kubodera, et al., "A Slab Waveguide Laser Formed of Glass-Clad LiNdP$_4$O$_{12}$".

Database WPIL, JP-A-86-327671, B. Deveaud, et al., "Semiconductor Laser Structure—Comprises Gallium Aluminium Arsenide or Phosphide as Active Layer, on Semiconductor Substrate", Oct. 31, 1986.

Primary Examiner—Frank Gonzalez
Attorney, Agent, or Firm—Oblon, Spivak, McClelland, Maier & Neustadt

[57] ABSTRACT

Optically pumped laser minicavity, its production process and laser using said cavity, wherein the minicavity comprises an electrically insulating, parallelepipedic, solid emitter (1b), having two polished parallel lateral faces (6, 8), a monocrystalline substrate (2) and several monocrystalline layers epitaxied on the substrate and having in directions parallel to said faces a hardness equal to that of the substrate, one of the layers constituting a guide layer (4) able to guide the light emitted by the emitter and the pumping light and another layer (12) constituting a non-guiding protective layer, the protective layer and the substrate constituting two opposite faces of the emitter perpendicular to the lateral faces, laser activating ions being contained within the substrate and/or in one of the layers. In the case of an internal cavity, semi-reflecting mirrors (9, 10) are placed on the lateral faces of the emitter.

20 Claims, 3 Drawing Sheets

OPTICALLY PUMPED LASER MINICAVITY, ITS PRODUCTION PROCESS AND LASER USING SAID CAVITY

The present invention relates to an optically pumped, crystal laser minicavity and more specifically to a laser minicavity using monocrystalline thin layers. The invention also relates to the production of said minicavity.

It is used in the field of microlasers more particularly employed in integrated optics, fibre optics, telecommunications, medicine (microsurgery, skin treatment) and for the research on semiconductors. In particular, the invention applies to microlasers optically pumped by a laser diode.

The laser emitter or amplifier crystal is constituted, in known manner in connection with laser diodes, by one or more monocrystalline layers deposited on an appropriate monocrystalline substrate. As a function of the envisaged application type, the thickness of said layers varies from a few micrometres to a few hundred micrometres.

Liquid phase epitaxy is one of the most widely used methods for producing monocrystalline layers.

The laser effect is obtained by the introduction into the epitaxied layers of active ions or laser activators, whose concentration is fixed as a function of the chosen pumping method (transverse or longitudinal) and as a function of the tolerance of said ions by the crystal lattice of the epitaxied layers.

In the case of a laser emitter with a waveguide structure, one of the layers of the emitter must have a refraction index higher than that of the immediately adjacent materials (layer or substrate) and in this way forms a guide layer guiding the lightwaves emitted by the emitter.

The refraction index of the guide layer is adjusted by the introduction of appropriate ions and its thickness is adapted to the chosen guidance mode (monomode or multimode).

In the case of thin monocrystalline layer lasers, use is made of semiconductor lasers based on III-V material, as described in FR-A-2 581 262, and electrically insulating lasers, particularly with metal oxides. Semiconductor lasers can be optically or electrically pumped, whereas electrical insulating lasers can only be optically pumped.

Oxide crystal lasers are in particular described in the following documents:

"Miniature neodymium lasers (MNL) as possible transmitters for fiber-optic communication systems. Part 1; Stoichiometric materials" by G. Winzer et al., pp. 287–295 (document 1) and "Part 2; YAG: $Nd^{3+}$ waveguide lasers" by P. Mockel et al, pp. 296–302 (document 2), published in Siemens Forsch.-u. Entwickl.-Ber. Bd. 5 (1976) no. 5;

"Single-transverse-mode $LiNdP_4O_{12}$ slab waveguide laser" by K. Kubodera and K. Otsuka, pp. 653–659, J. Appl. Phys. 50 (2), February 1979 (document 3);

"Glass waveguide laser" by H. Acki et al., "IEEE photonics technology letters", vol. 2, no. 7, July 1990, pp. 459–460 (document 4);

"A flashlamp-pumped YAG: $Nd^{3+}$ waveguide laser" by P. Mockel et al., "Journal of Appl. Phys.", vol. 45, no. 8, August 1974, pp. 3460–3462 (document 5);

"A slab waveguide laser formed of glass-clad $LiNdP_4O_{12}$", by K. Kubodera et al., J. Appl. Phys., 49 (1), January 1978, pp. 65–68 (document 6).

Thin layer or film laser emitters are produced by epitaxing various monocrystalline layers on a monocrystalline substrate and then taking paralellepipedic samples with a side length of a few millimeters from the substrate-layer assembly and this will form the active part of the laser cavity.

For III-V materials, said samples are obtained by cleaving the substrate-layer assembly, whereas for the oxides these samples are obtained by cutting the substrate-layer assembly in directions perpendicular to the layers, followed by the polishing of the cut faces.

The lateral faces of the sample obtained by cleaving (case of III-V materials) or by cutting and then polishing (case of oxides) constitute the entrance and exit faces for the stimulated light. In addition, these faces must be perfectly defined.

Moreover, the characteristics of the laser cavity will depend on the nature and the positioning of the semireflecting mirrors for the amplification of the light emitted by the active layer, as well as the cavity pumping method. In the case of an internal cavity, i.e. which is compact, monolithic and rigid, the semireflecting mirrors are joined to the lateral faces of the sample obtained by cleaving or cutting.

The definition of the lateral faces obtained by cleaving does not cause a problem. This does not apply with respect to the faces obtained by cutting the substrate-layer assembly.

The invention applies to crystal and in particular oxide laser cavities obtained by cutting an epitaxied layer-substrate assembly. Lasers using oxide crystals are at the moment being produced to an ever greater extent.

In a waveguide structure, as shown in perspective in FIG. 1, the emitter is constituted by a monocrystalline oxide substrate 2 and an active and guiding oxide layer 4. The emitter carries the general reference 1. The faces designated $A_1B_1B_sA_s$ and $C_1D_1D_sC_s$ are faces obtained by cutting and polishing the active layer-substrate assembly 2-4.

The faces $ABB_1A_1$ and $DCC_1D_1$ of the active layer 4 constitute the active faces of the emitter. They must have a certain number of qualities and must be strictly perpendicular to the emitter face $A_1B_1C_1D_1$. In addition, they must have a perfect polishing in order to reduce optical losses.

In addition, the edges $A_1B_1$ and $D_1C_1$ must be sharp and as regular as possible, without any serrations, the latter introducing light losses by diffraction in the laser cavity. At present, the obtaining of such sharp edges $A_1B_1$ and $C_1D_1$ is a critical point with respect to non-cleavable material laser emitters and it is virtually impossible to obtain them in rectilinear, serration-free form. This is clear from the aforementioned article 5 by Mockel.

Figure 2:
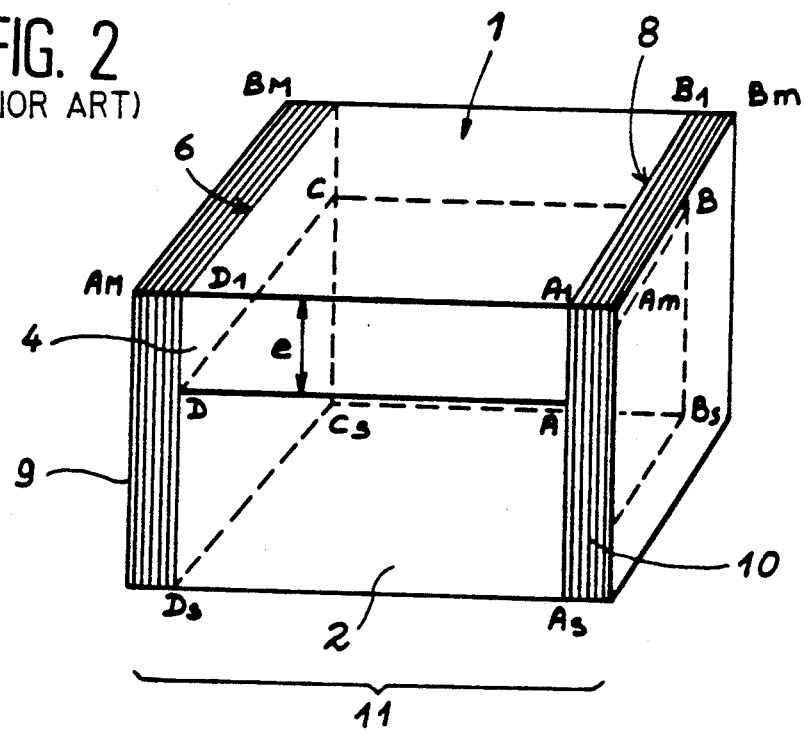

Moreover, the faces 6 and 8, i.e. $A_1B_1B_sA_s$ and $D_1C_1C_sD_s$ of the emitter 1 can, as shown in perspective in FIG. 2, be respectively covered by a semireflecting mirror 9 and 10, obtained by the deposition of several appropriate dielectric layers. The internal laser cavity obtained carries the general reference 11. These deposits 9 and 10 must be as homogeneous as possible facing the active faces $A_1B_1BA$ and $D_1C_1CD$ of the emitter 1.

Bearing in mind the thickness e of the active layer 4, of a few micrometers to a few hundred micrometers, it is clear that these requirements cannot be completely satisfied.

In addition, during the deposition of multilayer dielectric mirrors 9 and 10, the area $A_1B_1B_mA_m$ and the entire area $C_1D_1A_MB_M$ of the laser cavity are disturbed. Thus, lightwave diffraction and diffusion phenomena will occur in areas $A_1B_1B_mA_m$ and $C_1D_1A_MB_M$ due to the edge effects and this will lead to an increase in the optical losses of the light guide 4.

Improvements to the laser cavity were envisaged in documents 3 and 6 by K. Kubodera referred to hereinbefore for the purpose of limiting these optical losses. These improvements consisted of depositing a glass layer on the guide layer of the $LiNdP_4O_{12}$ laser cavity, supported by a glass substrate, prior to the cutting of the sample, followed by the polishing of the faces obtained by cutting the stack of two glass substrates and the optical guide.

These glass substrates are joined to the guide structure and create light losses at the guide layer-glass substrate interfaces. Moreover, the structure obtained is unstable and as the nature and hardness of the materials used vary considerably, it is very difficult to polish the active faces of the laser cavity and it is not possible to obtain strictly planar, active lateral faces.

The invention aims at a novel optically pumped laser minicavity using a non-cleavable emitter crystal, which makes it possible to obviate the various disadvantages referred to hereinbefore. The invention also relates to a process for the production of said laser minicavity and to a laser equipped with said minicavity.

To obviate the disadvantages referred to hereinbefore, the invention proposes creating a sharp edge on the lateral faces of the laser cavity, different from that of the guide layer.

More specifically, the invention relates to an optically pumped laser minicavity having a paralellepipedic solid emitter, which is electrically insulating and has a guide structure, provided with two polished, parallel lateral faces, a monocrystalline substrate and several monocrystalline layers epitaxied on the substrate and having in directions parallel to said faces a hardness equal to that of the substrate, the substrate and the epitaxied layers being non-cleavable, one of these layers constituting a guide layer able to guide the light emitted by the emitter and the pumping light and having a refraction index higher than that of the adjacent materials and another layer constituting a non-guiding protective layer, the protective layer and the substrate constituting two opposite faces of the emitter perpendicular to said lateral faces, laser activating ions being contained within the substrate and/or one of the epitaxied layers.

Thus, the guide layer is surrounded by two materials of the same nature, but lower index, which symmetrizes the index profile and improves the performance characteristics of the optical guide. Moreover, the supplementary layer makes it possible to reject from the active zone of the laser the sharp edge of the cavity, which now becomes a non-active edge.

In addition, the cutting and polishing of the lateral faces of the solid emitter becomes much easier, because all the materials are now of the same hardness and type. Under these conditions, the outer edge of the guide layer, is no longer a sharp edge and is consequently protected and can therefore be obtained with an almost perfect quality.

The laser cavity can be an external cavity equipped with two mirrors on either side of the emitter and at a certain distance from the lateral faces.

However, with a view to reducing the overall dimensions of the laser cavity, each semireflecting mirror can be placed on one of the lateral faces of the emitter.

These mirrors may be simply bonded or deposited. In the latter case, the mirrors are more particularly constituted by multilayer, dielectric material deposits.

The improvement to the lateral faces and in particular the active faces of the guide layer of the laser cavity makes it possible to improve the performance characteristics of the semireflecting mirrors, particularly when the latter are in the form of deposited multilayer dielectrics.

According to the invention, the activating ions can be contained in the substrate or in one of the layers, the latter then constituting an active layer, or at the same time can be contained both in the substrate and one of the epitaxied layers. Preferably, the activated ions are present in one of the epitaxied layers, whereby this can in particular be the protective layer.

Moreover, the laser cavity according to the invention can have a guide layer separate from the active layer. In this case, the guide layer can be epitaxied on the substrate or on the active layer, the latter then being epitaxied on the substrate. Preferably, the guide layer and the active layer constitute the same layer.

It is also possible to interpose between the substrate and the guide layer or between the substrate and the active layer, as a function of the respective positions of the epitaxied layers, a buffer layer in order to insulate the active layer or the guide layer from the substrate. This buffer layer must be of the same nature and hardness as the substrate and the other epitaxied layers and must also be formed by epitaxy.

In the same way, it is possible to provide a confinement layer between the guide layer and the supplementary protective layer. This confinement layer must also be obtained by epitaxy and have a hardness equal to that of the other layers and be of the same nature as the latter.

For refraction index symmetry reasons, the buffer and confinement layers are advantageously produced from the same material. In the same way, the protective layer and the substrate are preferably produced from the same material. However, it is also possible to use materials having different compositions for the substrate and each of the different layers.

Moreover, advantageously, the active layer is made from the same material as the substrate and the protective layer or from a similar material doped by activating ions.

The laser cavity can apply to all laser emitters based on non-cleavable materials such as oxides. In particular, the substrate and the epitaxied layers are mixed metal oxides and the laser activating ions of said oxides are ions of rare earths and/or ions of transition metals.

In particular, the laser cavity can be produced from materials of type $Y_3Al_5O_{12}$ (or YAG); $Gd_3Ga_5O_{12}$ (GGG); $Gd_3Ga_5O_{12}$, in which part of the gallium is substituted by scandium (or ScGGG) or substituted by magnesium and zirconium (SGGG); $LaMgAl_{11}O_{19}$ (LMA); $Y_2SiO_5$ (or YSO); $YAL_3$ $(BO_3)_4$ (or YAB).

In order to adjust the refraction index of these materials, it is possible to substitute all or part of the aluminium by gallium and conversely all or part of the gallium by aluminium.

The active ions or laser activators are in particular neodymium, erbium, thulium, praseodymium or ytterbium ions or chromium, titanium, vanadium and similar ions.

The invention also relates to a process for the production of the above-defined laser minicavity comprising:

a) the liquid phase epitaxy of the monocrystalline layers on the substrate, with the protective layer last, b) cutting in the assembly obtained in a) a parallelepiped, whose cutting planes are perpendicular to the layers and which define the lateral faces and c) polishing said lateral faces.

In order to further improve the quality of the laser cavity, it is possible to carry out mechanochemical polishing of the guide layer surface which is intended to receive the protective layer, prior to the epitaxy of the latter.

The invention also relates to an optically pumped crystal minilaser having a laser minicavity such as that defined hereinbefore and laser emitter optical pumping means. Advantageously, the pumping means comprise a laser diode or a laser diode array.

In order to reduce to the greatest possible extent the overall dimensions of the laser, said diode or diode array can be joined to the lateral faces of the laser emitter at the active layer. Obviously, this arrangement is not obligatory and other arrangements, like that described in document 1, can be used.

The use of laser diodes for optical pumping permits a miniaturization of the solid lasers, because the latter have much smaller sizes than those of the other light pumping means conventionally used, such as flashlamps or lasers. Moreover, laser diodes have a very high level of reliability and light efficiencies well above those of flashlamps.

The invention is described in greater detail hereinafter relative to non-limitative embodiments and with reference to the attached drawings, wherein show:

FIGS. 1 and 2 Already described, diagrammatically and in perspective an emitter and a laser cavity according to the prior art.

Figure 3:
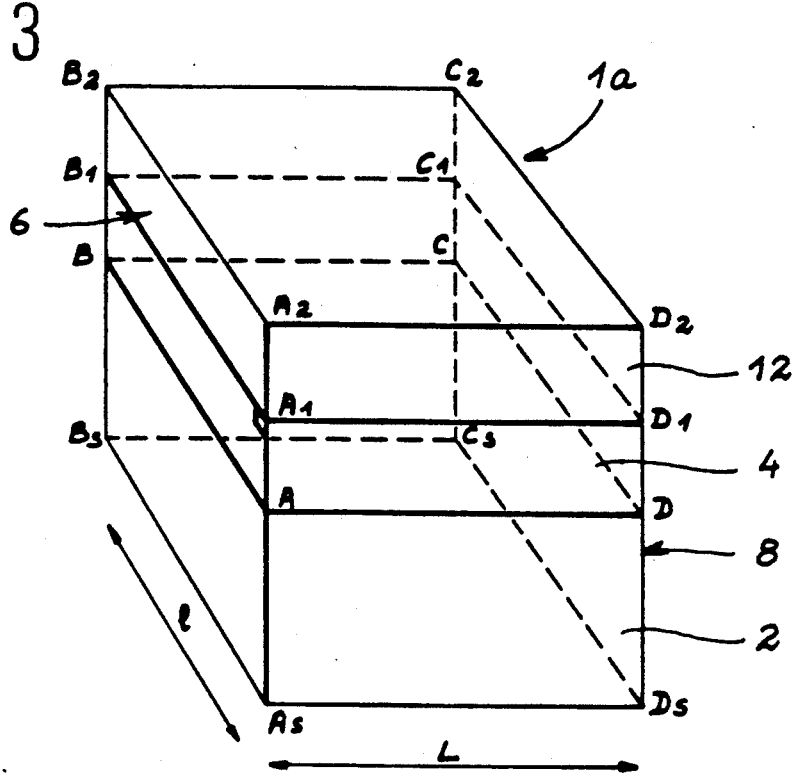
Figure 4:
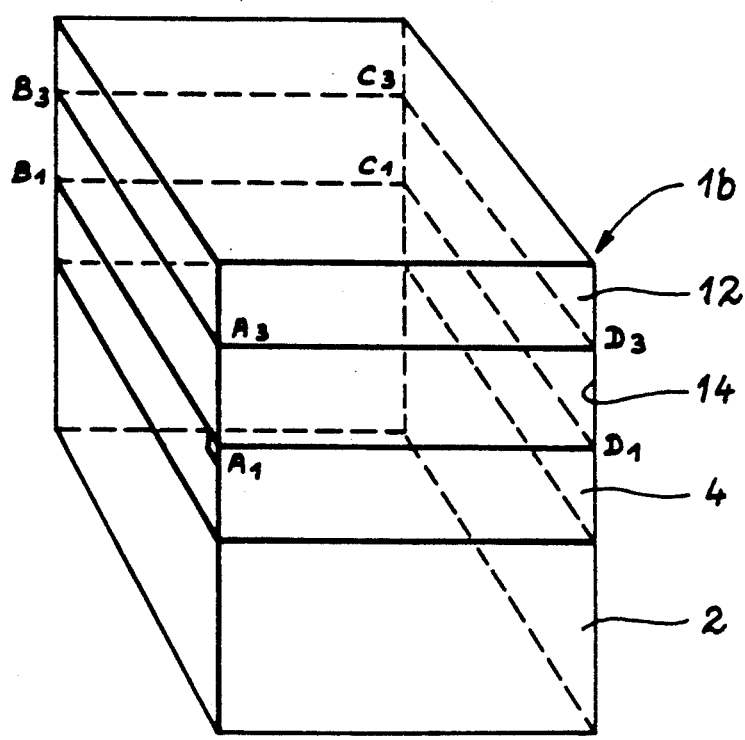
Figure 5:
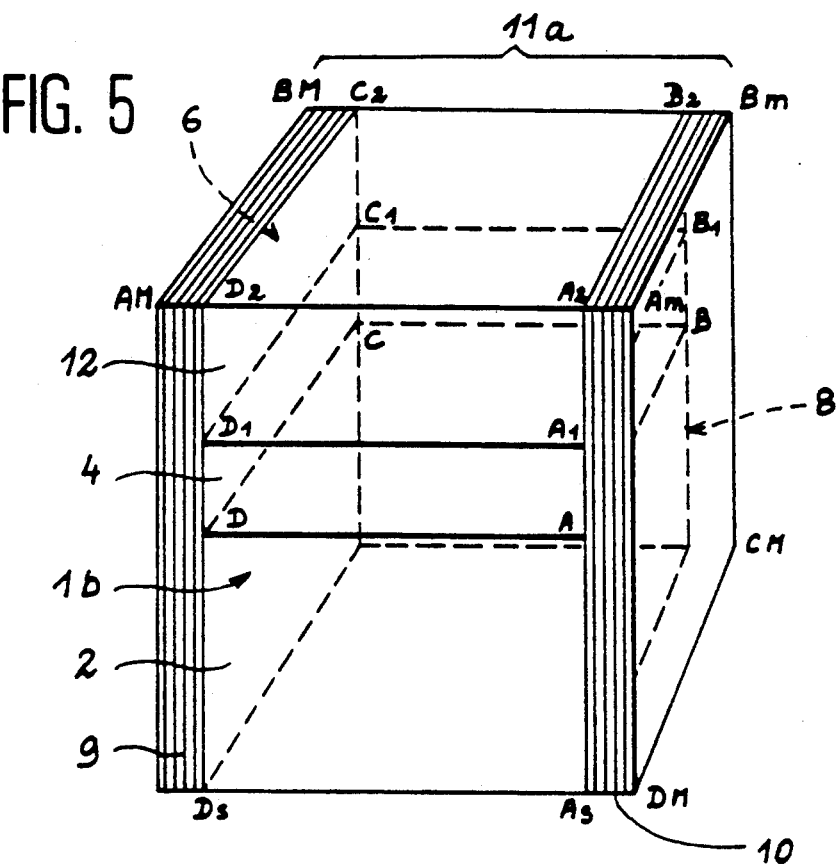

FIGS. 3, 4 and 5 Diagrammatically and in perspective laser cavities according to the invention, FIGS. 3 and 4 relating to external laser cavities and FIG. 5 to an internal laser cavity.

Figure 6:
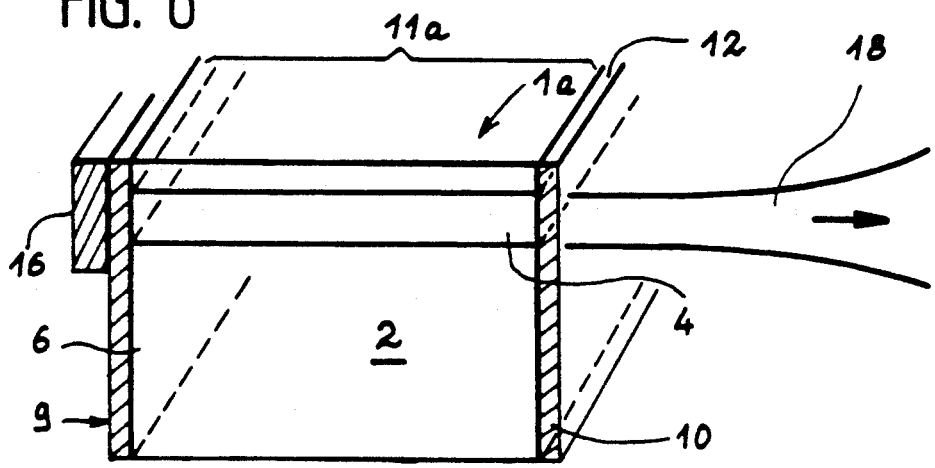

FIG. 6 Diagrammatically a microlaser according to the invention optically pumped by a laser diode.

The invention relates to any laser material obtainable in the form of thin monocrystalline layers or films by liquid phase epitaxy on a solid monocrystalline substrate. The monocrystalline layers have a structure identical or close to that of the substrate and at least one of these layers is a guide layer. The active ion or ions responsible for the laser effect can be located in at least one of the epitaxied layers, including the guide layer and the supplementary layer, and optionally in the substrate.

In order to simplify the following description, it will apply to YAG and the laser activating ions are contained in an active layer separate from the substrate. The elements identical to those of the prior art will carry the same references.

The laser emitter shown diagrammatically and in perspective in FIG. 3 carries the reference numeral 1a. It has a pure monocrystalline $Y_3Al_5O_{12}$ substrate 2 prepared from a monocrystalline ingot obtained by Czockralski pulling. The substrate 2 is an oriented and polished monocrystalline plate. It supports an epitaxy, monocrystalline active layer 4, which is of doped $Y_3Al_5O_{12}$.

In this type of oxide, one of the interesting dopants is neodymium because, in this case, the active layer 4 having the laser effect also becomes a guide layer. Thus, the doping of $Y_3Al_5O_{12}$ by neodymium increases its refraction index. The substrate 2 has a thickness of approximately 500 μm and the active layer 4 a thickness between 1 and 150 μm.

According to the invention, there is a supplementary 30 to 150 μm thick, undoped, monocrystalline $Y_3Al_5O_{12}$ layer 12 epitaxied on the active layer 4. Thus, the substrate 2, the active layer 4 and the protective layer 12 only differ by the nature of the doping of the layer 4 and consequently has the same hardness.

The laser emitter of FIG. 3 is obtained by liquid phase epitaxy of the layers 4 and 12. Liquid phase epitaxy is a well known procedure for preparing monocrystalline layers of magnetic or non-magnetic garnets. It is in particular described in EP-A-142 931. It permits the growth of layers 4 and 12 by impregnating the monocrystalline substrate 2 in a supersaturated solution using a solvent.

In the present case, the epitaxy bath is constituted by a mixture of different oxides. The solute for the active layer is constituted by $Y_2O_3$, $Al_2O_3$ and $Nd_2O_3$ and the solvent is a mixture of PbO and $B_2O_3$.

For the growth of the active guide layer, use is e.g. made of the following proportions in mole %:

$Y_2O_3$:0.33
$Nd_2O_3$:0.07
$Al_2O_3$:2.3
PbO:89.9
$B_2O_3$:7.4

The thus obtained active layer then has the following formulation $Y_{3-x}Nd_xAl_5O_{12}$ with x equals 0.05.

The oxides used for producing the bath are commercially available and have a purity of 99.999%. They are mixed and melted in a platinum crucible, in air and at ambient pressure.

The doped layer 4 is grown at a constant temperature Td below the saturation temperature Ts of the bath by impregnating the substrate 2 in the bath. The thickness of the layer is dependent on the super-saturation $\delta T = Ts - Td$ and the impregnation time.

Following the growth of the active layer, which also serves as the guide layer, there is possible mechanochemical polishing of its surface $A_1B_1C_1D_1$ and then the substrate 2 coated with its active layer is impregnated again in a new epitaxy bath constituted by $Y_2O_3$, $Al_2O_3$, $PbO_2$ and $B_2O_3$. The proportions are the same as hereinbefore, with the exception of the $Y_2O_3$ quantity which is 0.40 mole % and the neodymium quantity which is zero. The growth of the $Y_3Al_5O_{12}$ protective layer 12 takes place under the same conditions as for the active layer.

When the crystal lattice parameters of the layer 4 and the substrate 2 become too large, which is particularly the case when the neodymium concentration increases or when gallium has been added to the epitaxy bath for increasing the index difference between the layers, it is necessary to adjust the lattice parameters by e.g. substituting one of the elements of the active layer by another element. In particular, it is possible to replace part of the yttrium by lutetium.

In these conditions, the structure obtained is in the following general form:

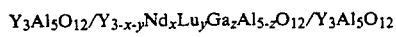

$Y_3Al_5O_{12}/Y_{3-x-y}Nd_xLu_yGa_zAl_{5-z}O_{12}/Y_3Al_5O_{12}$ with $0 < x+y < 3$ in which y is in particular such that $0 < y \leq 1.5$ and x is such that $0 < x \leq 0.3$ and with z such that $0 \leq z \leq 0.5$.

The thus obtained layer stack is then cut into samples with a side length of a few millimeters and using a multiple-wire saw. The parallelepiped obtained has length L of approximately 7 mm and a width 1 of approximately 5 mm.

The faces ($A_2B_2B_5A_5$) 6 and ($C_2D_2D_5C_5$) 8 constituting the cutting planes of the substrate-epitaxied layer assembly are mechanochemically polished. The polishing of said faces 6 and 8 can take place by assembling in juxtaposed form several emitters 1a, in order to ensure a good parallelism of the faces, as well as a good perpendicularity with respect to the surface $A_2B_2C_2D_2$ or plane of the layers.

Under these conditions, a sharp edge $A_2B_2$ and respectively $D_2C_2$ of the emitter 1a is obtained. In addition, the edge $A_1B_1$ of the guide layer and consequently the edge $C_1D_1$ of said same layer is perfectly sharp and protected as a result of the protective layer 12.

As a result of the use of layers having an identical or similar nature to that of the substrate and due to the liquid phase epitaxial growth, the emitter 1a according to the invention behaves like a monocrystal. In particular, the interface effects between the active layer 4 and the substrate 2, plane ABCD of the emitter 1a, as well as the interface effects between the protective layer 12 and the active layer, corresponding to the plane $A_1B_1C_1D_1$, are nonexistent, unlike in the case of the prior art structures using joined materials and of a different nature from that of the guide layer.

In certain cases, the doping of the active layer 4 may not be sufficient to ensure that the refraction index of said layer 4 exceeds that of the adjacent layers and can constitute the guide layer of the laser emitter. In this case, the laser emitter can have the structure shown in FIG. 4.

The laser emitter 1b shown in FIG. 4 differs from that shown in FIG. 3 by the interposing between the active layer 4 and the upper protective layer 12 of a layer 14 serving as a guide layer, whereas the layer 4 only serves as an active layer.

The layer 14 has an approximate thickness of 10 μm, its composition is close to that of the layer 4 and that of the layer 12, except that it contains a doping ion permitting an increase in its index so as to be able to guide the light emitted by the layer 4. In this configuration, the edges $A_3B_3$ and $C_3D_3$ are sharp and protected by the layer 12.

The structure shown in FIG. 4 can in particular be produced from $Y_3Al_5O_{12}$ with an active layer of $Y_{3-x}Nd_xAl_5O_{12}$ and a guide layer of $Y_{3-y}Lu_yAl_{5-z}Ga_3O_{12}$ with x, y and z having the same values as given hereinbefore.

In order to produce an internal laser cavity, it is possible in the manner shown in FIG. 5 to deposit on the polished lateral faces 6 and 8 of the emitter 1A mirrors 9 and 10 constituted by a stack of dielectric layers. The laser cavity carries the general reference 11a.

These mirrors must be semireflecting so as to permit part of the light emitted in the active layer to be reinjected into the latter for amplification purposes. They must have a maximum reflection coefficient for the wavelength emitted by the layer 4. The entrance mirror, e.g. 9, must be transparent to the light used for optical pumping and the exit mirror, e.g. 10, must be transparent to part of the emitted light. The entrance mirror 9 and exit mirror 10 of the laser cavity are those conventionally used.

The laser cavity according to the invention can obviously be used in a laser like that diagrammatically shown in FIG. 6. This laser is a microlaser equipped with the cavity 11a shown in FIG. 5, said laser more particularly having a laser diode 16 positioned level with the active layer 4. This diode 16 can be bonded to the entrance mirror 9 of the laser cavity 11a with the aid of an optical adhesive or glue. The laser beam 18 amplified in the cavity 11a passes out through the mirror 10.

Under the conditions described hereinbefore, the laser cavity 11a emits a beam 18 with an approximate wavelength of 10.6 μm and the laser diode 16 can be a diode emitting at 800 nm.

A laser cavity with a structure in accordance with FIG. 3, in which the active layer 4 is constituted by 30 μm thick $Y_{2.95}Nd_{0.05}Al_5O_{12}$ and whose protective layer 12 is constituted by 80 μm thick $Y_3Al_5O_{12}$ was produced under the conditions described hereinbefore. It makes it possible to obtain a guided mode laser effect (multimode) with a threshold as low as 0.6 mW. The losses induced in the guide are below 0.05 dB/cm and consequently are much lower than those obtained in a conventional guide of the type illustrated by FIG. 1, where they reach 1 dB/cm. The laser efficiency levels of said cavity are approximately 40% with respect to the incident pumping light.

During the use as a laser emitter of an oxide doped by activating ions emitting in a wide wavelength range (case of chromium or holmium), it is possible to add a wavelength selector. Under these conditions, the selector will be interposed between the exit mirror 10 and the emitter.

We claim:

1. A solid, electrically insulating laser emitting minicavity having a paralellepipedic shape, and a light guiding structure comprising two polished, parallel lateral faces (6, 8), a monocrystalline substrate (2) and a plurality of monocrystalline layers (4, 12, 14) epitaxied one on top of the other on the substrate and having in directions parallel to said faces a hardness equal to that of the substrate, the substrate and the epitaxied layers each being non-cleavable, one of the layers constituting a guide layer (4, 14) able to guide pumping light and light emitted by the minicavity and having a refraction index higher than that of adjacent materials (2, 4, 12) and another layer (12) constituting a non-guiding protective layer, the protective layer and the substrate constituting two opposite faces of the minicavity perpendicular to said lateral faces, laser activating ions being contained within the substrate, one of the epitaxied layers, or both the substrate and one of the epitaxied layers.

2. The laser emitting minicavity according to claim 1, characterized in that the laser activating ions are contained in one of the epitaxied layers, thus constituting an active layer (4).

3. The laser emitting minicavity according to claim 1, characterized in that the guide layer (4) and the active layer constitute the same layer.

4. The laser emitting minicavity according to claim 1, further comprising a semireflecting mirror (9, 10) placed on each of the lateral faces (6, 8).

5. The laser emitting minicavity according to claim 4, characterized in that the two mirrors (9, 10) are constituted by deposits of material made on said lateral faces.

6. The laser emitting minicavity according to claim 4, characterized in that the mirrors (9, 10) are constituted by deposits of multilayer dielectrics.

7. The laser emitting minicavity according to claim 1, characterized in that the supplementary layer (12) is of the same nature as the active layer.

8. The laser emitting minicavity according to claim 1, characterized in that the substrate (2) and the epitaxied layers (4, 12, 14) are mixed metal oxides and in that the laser activating ions are ions of rare earths, transition metals or rare earths and transition metals.

9. The laser emitting minicavity according to claim 1, characterized in that the substrate (2) is a substrate chosen from among $Y_3Al_5O_{12}$; $Gd_3Ga_5O_{12}$; $Gd_3Ga_5O_{12}$ with part of the gallium substituted by scandium or by magnesium or zirconium; $LaMgAl_{11}O_{19}$; $Y_2SiO_5$; and $YAl_3(BO_3)_4$.

10. The laser emitting minicavity according to claim 9, characterized in that the supplementary layer (12) has the same composition as the substrate.

11. The laser emitting minicavity according to claim 1, characterized in that the laser emitter comprises an undoped $Y_3Al_5O_{12}$ substrate, an active $Y_3Al_5O_{12}$ layer doped with neodymium ions also serving as a guide layer and an undoped, supplementary $Y_3Al_5O_{12}$ layer.

12. Process for the production of the laser minicavity according to claim 1, characterized in that it comprises:
   a) liquid phase epitaxy of the monocrystalline layers on the substrate, with the protective layer last,
   b) cutting in the assembly obtained in a) a parallelepiped, whose cutting planes (6, 7) are perpendicular to the layers and define the lateral faces and
   c) polishing said lateral faces.

13. Process according to claim 12, characterized in that the surface of the epitaxied layer which is to receive the protective layer is polished.

14. Process according to claim 12, characterized in that dielectric deposits (9, 10) are produced on said lateral faces in order to constitute semireflecting mirrors.

15. Optically pumped crystal minilaser, characterized in that it comprises the laser emitting minicavity of claim 1.

16. Minilaser according to claim 15, characterized in that the pumping means comprise at least one laser diode (16).

17. Minilaser according to claim 15, characterized in that the diode is joined to one of its lateral faces (6) at the active layer (4).

18. The laser emitting minicavity according to claim 1, wherein said laser activating ions are contained within the substrate.

19. The laser emitting minicavity according to claim 1, wherein said laser activating ions are contained within one of the epitaxied layers.

20. The laser emitting minicavity according to claim 1, wherein said laser activating ions are contained within both the substrate and one of the epitaxied layers.

* * * * *